(12) United States Patent
Robinson (10) Patent No.: US 7,870,367 B1
(45) Date of Patent: Jan. 11, 2011

(54) METHODS AND APPARATUS FOR IMPLEMENTING COMPLEX PARALLEL INSTRUCTIONS USING CONTROL LOGIC

(75) Inventor: Chris Robinson, San Jose, CA (US)

(73) Assignee: Altera Corporation, San Jose, CA (US)

(*) Notice: Subject to any disclaimer, the term of this patent is extended or adjusted under 35 U.S.C. 154(b) by 382 days.

(21) Appl. No.: 10/463,819

(22) Filed: Jun. 17, 2003

(51) Int. Cl.
G06F 9/30 (2006.01)
G06F 9/40 (2006.01)
G06F 7/38 (2006.01)
G06F 9/00 (2006.01)
G06F 9/44 (2006.01)

(52) U.S. Cl. .................. 712/206; 712/209; 712/220
(58) Field of Classification Search .......... 712/208, 712/209, 220, 206
See application file for complete search history.

(56) References Cited

U.S. PATENT DOCUMENTS

| 4,589,067 | A | * | 5/1986 | Porter et al. | ........... 712/9 |
| 4,760,525 | A | * | 7/1988 | Webb | ........... 712/2 |
| 5,761,698 | A | * | 6/1998 | Combs | ........... 711/100 |
| 6,141,673 | A | * | 10/2000 | Thayer et al. | ........... 708/402 |

OTHER PUBLICATIONS

Wittig et al.; "OneChip: An FPGA Processor With Reconfigurable Logic"; IEEE; 1996.*
Carrillo et al.; "The Effect of Reconfigurable Units in Superscalar Processors"; 2001; ACM.*
"The Circuit Characterization and Generation Project at the University of Toronto", retrieved from the internet www.eecg.toronto.edu/mdhutton/gen/ on Jan. 24, 2005, 2 pages.
Michael D. Hutton, "Using CIRC and GEN Version 2.x—Draft in Preparation", Jun. 12, 1996, 19 pages.

* cited by examiner

Primary Examiner—Chun-Kuan Lee
Assistant Examiner—Benjamin P Geib
(74) Attorney, Agent, or Firm—Weaver Austin Villeneuve & Sampson LLP (57) ABSTRACT

Methods and apparatus are provided for implementing complex parallel instructions on a processor having a supported instruction set. Complex parallel instructions provide that an operation code, control logic, and input data is passed to a processor core. The operation code identifies the instruction used to process the input data and the control logic identifies the state of the instruction. An intervening instruction can be executed by a processor core even before execution of a complex parallel instruction is complete.

30 Claims, 10 Drawing Sheets

METHODS AND APPARATUS FOR IMPLEMENTING COMPLEX PARALLEL INSTRUCTIONS USING CONTROL LOGIC

BACKGROUND OF THE INVENTION

1. Field of the Invention

The present invention relates to instruction set computing. In one example, the techniques of the present invention provide mechanisms for allowing the implementing of complex parallel instructions in a processor core.

2. Description of the Prior Art

Typical processors largely fall into the Reduced Instruction Set Computing (RISC) or the Complex Instruction Set Computing (CISC) category. RISC processors generally execute one instruction per clock cycle. Instructions include adds, subtracts, compares, tests, etc. Instructions have a fairly uniform length and instruction sets are streamlined to contain only the most frequently used instructions. More involved operations are performed by breaking down operations into simpler instructions.

CISC processors typically execute slightly more complex, varying length instructions in multiple clock cycles. For example, instead of performing a simple comparison, a CISC instruction could compare a value against an upper bound as well as a lower bound. Instead of merely testing a condition, a CISC instruction can test, decrement, and branch in a single instruction.

Conventional RISC and CISC processors provide instructions that can be used to perform a variety of operations. However, using RISC or CISC processor to perform more involved operations such as digital signal processing, video processing, or cryptographic operations can be inefficient. Many operations involved in digital signal processing, video processing, and cryptography are redundant but involved operations that are highly suitable for implementation on specialized accelerators. A variety of Application Specific Integrated Circuits (ASICs) such as Digital Signal Processors, Video Accelerators, and Cryptography Accelerators are customized for performing specialized operations efficiently. Some of these accelerators are coupled to a processor using a system bus. However, separate accelerators introduce latency and other inefficiencies into a computer system.

Consequently, it is therefore desirable to provide improved methods and apparatus for improving performance of specialized operations. More specifically, it is desirable to provide improved mechanisms for implementing specialized operations on a system on a programmable chip or a system on a chip.

SUMMARY OF THE INVENTION

Methods and apparatus are provided for implementing complex parallel instructions on a processor having a supported instruction set. Complex parallel instructions provide that an operation code, control logic, and input data is passed to a processor core. The operation code identifies the instruction used to process the input data and the control logic identifies the state of the instruction. An intervening instruction can be executed by a processor core even before execution of a complex parallel instruction is complete.

In one embodiment, a method for executing processor instructions is provided. An operation code, control information, and input data is received at an arithmetic logic unit in a processor, the processor having a supported instruction set. An instruction is executed in the arithmetic logic unit using the input data. The instruction is identified by the operation code. The execution state of the instruction is determined by the received control information.

Possible execution states include starting the execution of the instruction, polling to determine if the instruction is complete, and loading or unloading the instruction. Polling performed to determine if the instruction is complete allows execution of instructions taking an indeterminate number of clock cycles as well as the execution of intervening instructions on the arithmetic logic unit while the instruction is executing on the arithmetic logic unit.

In another embodiment, a processor is provided. The processor includes a plurality of registers, an interface, and an arithmetic logic unit. The interface couples the processor to off-chip memory. The arithmetic logic unit is coupled to the plurality of registers and the interface. The arithmetic logic unit includes a plurality of input buffers and a plurality of output buffers, wherein the arithmetic logic unit is operable to load data from registers into the input buffers when an instruction is received with a load execution state and start execution of the instruction when the instruction is received with a start execution state.

The arithmetic logic unit is operable to poll to determine if the instruction is complete when the instruction is received with a polling execution state and is also operable to execute an intervening instruction after the instruction with the start execution state is received. The arithmetic logic unit can execute an intervening instruction while polling for completion of the instruction. Address information received by the arithmetic logic unit can be used to identify a location in an input buffer or output buffer associated with the arithmetic logic unit.

The multiple input and output buffers allow loading of data from a plurality of processor registers into the arithmetic logic unit in a single clock cycle. Instructions supported include customized instructions.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media. Still other aspects relate to systems including a processor and memory for implementing a method as described above. Any of the method or techniques of this invention may be implemented on a system having a processor and memory.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
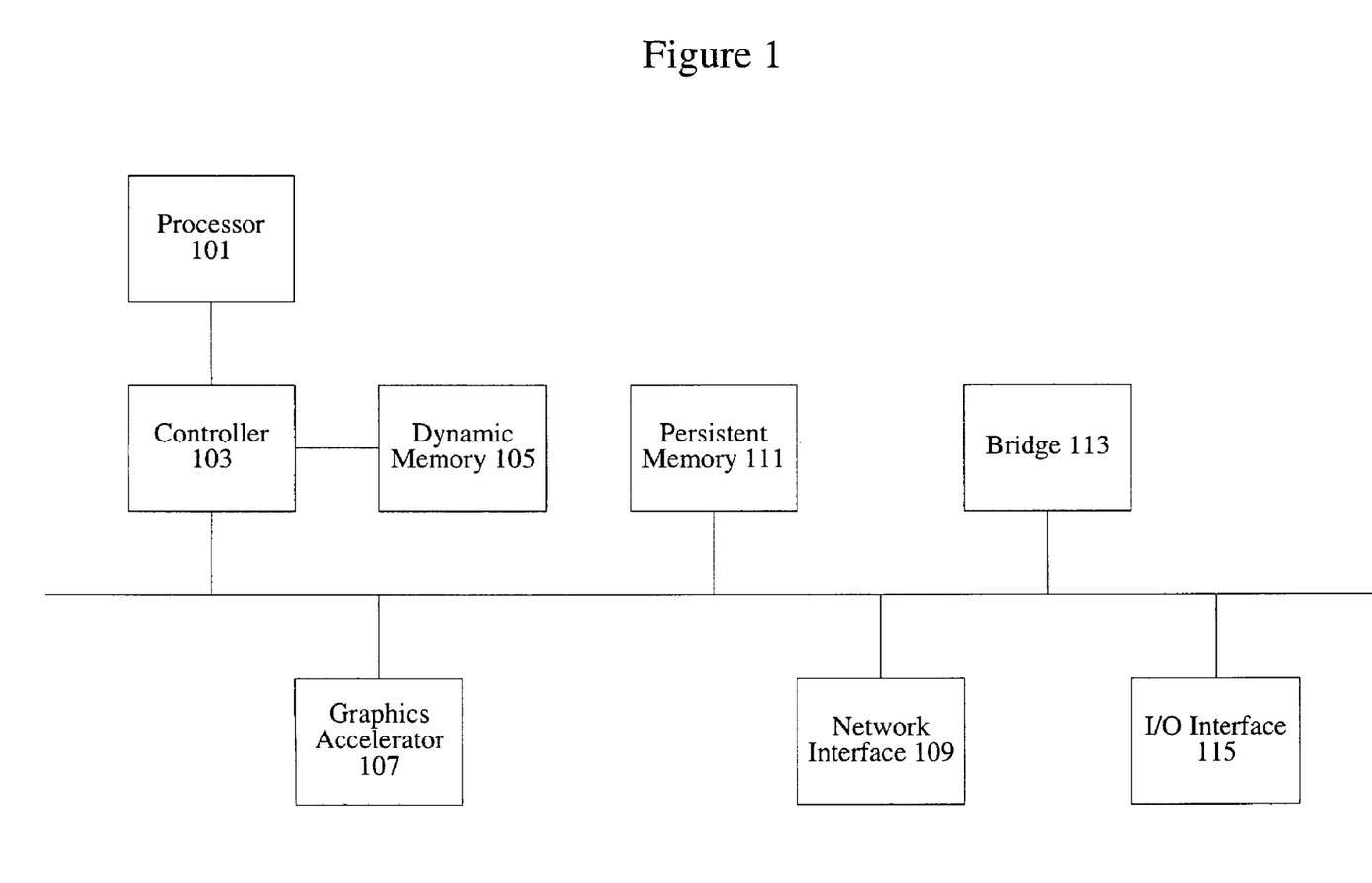
FIG. 1 is diagrammatic representation showing a processor and peripheral components.

FIG. 1 is diagrammatic representation showing a processor and peripheral components in a computer system. Typical computer systems include a processor 101 coupled to dynamic memory 105 through a controller 103. In some instances, a controller 103 is integrated with a processor 101. A variety of different types of memory including Synchronous Dynamic Random Access Memory (SDRAM) can be used. The processor is connected to other components in the system typically through a bus interface such as a peripheral components interface (PCI). Other bus and linking mechanisms that provide higher throughput such as HyperTransport or Infiniband can be used as well. Other components in the system include persistent memory 111, such as a hard disk or a static memory chip. The bridge 113 is provided to allow communication with other buses and links. An input output (I/O) interface 115 allows user interaction with the computer system. The I/O interface 115 provides connectivity with various devices such as keyboards, monitors, printers, etc. A network interface 109 allows a computer system to communicate with other computer systems over a local area network or a wide area network.

According to various embodiments, the computer system also includes a graphics accelerator 107 dedicated for performing various graphics related operations. A variety of dedicated processors such as digital signal processors, graphics accelerators, and cryptography accelerators allow a computer system to perform specific operations with more efficiency than allowed by a general purpose processor or a central processing unit 101.

For example, if a system does not have a graphic accelerator 107, various rendering, smoothing, texture mapping, and modeling operations would be performed by a processor 101. The processor 101 would include an instruction set that would allow the performance of various operations such as add, compare, etc. A developer would write software code for performing various graphics related operations and the software would be converted into serial instructions supported by the processor for performing the graphics related operations. However, performing some of these operations using a general purpose processor supporting a general purpose instruction set can be inefficient. Furthermore, the graphics related operations may take a large portion of processor resources and leave the processor unavailable for other tasks.

Consequently, dedicated processors such as graphics accelerators are provided for performing these particular graphics related operations. Instead of having a developer write software code for performing a rendering operation, the developer can call a particular function supported by the graphics accelerator 107 in order to perform this operation. Instead of writing an entire code sequence, the developer merely packages the data in the proper format and passes the data to the graphics accelerator 107. In typical instances, this entails a processor 101 obtaining data from a dynamic memory 105 through a controller 103. The data would then be passed from processor 101 to graphics accelerator 107. In many instances the graphics accelerator would continue to read and write data from dynamic memory 105. However, passing data between the graphics accelerator 107 and a processor 101 introduces delay and coordination difficulties between the two devices. In many instances, bus latency decreases graphics related performance of the system even though the graphics accelerator 107 is provided. The packaging and repackaging of data before passing the data to the graphics accelerator 107 also introduces inefficiencies. More recent efforts have focused on providing specialized components such as graphics accelerators on a single chip with a processor core.

Figure 2:
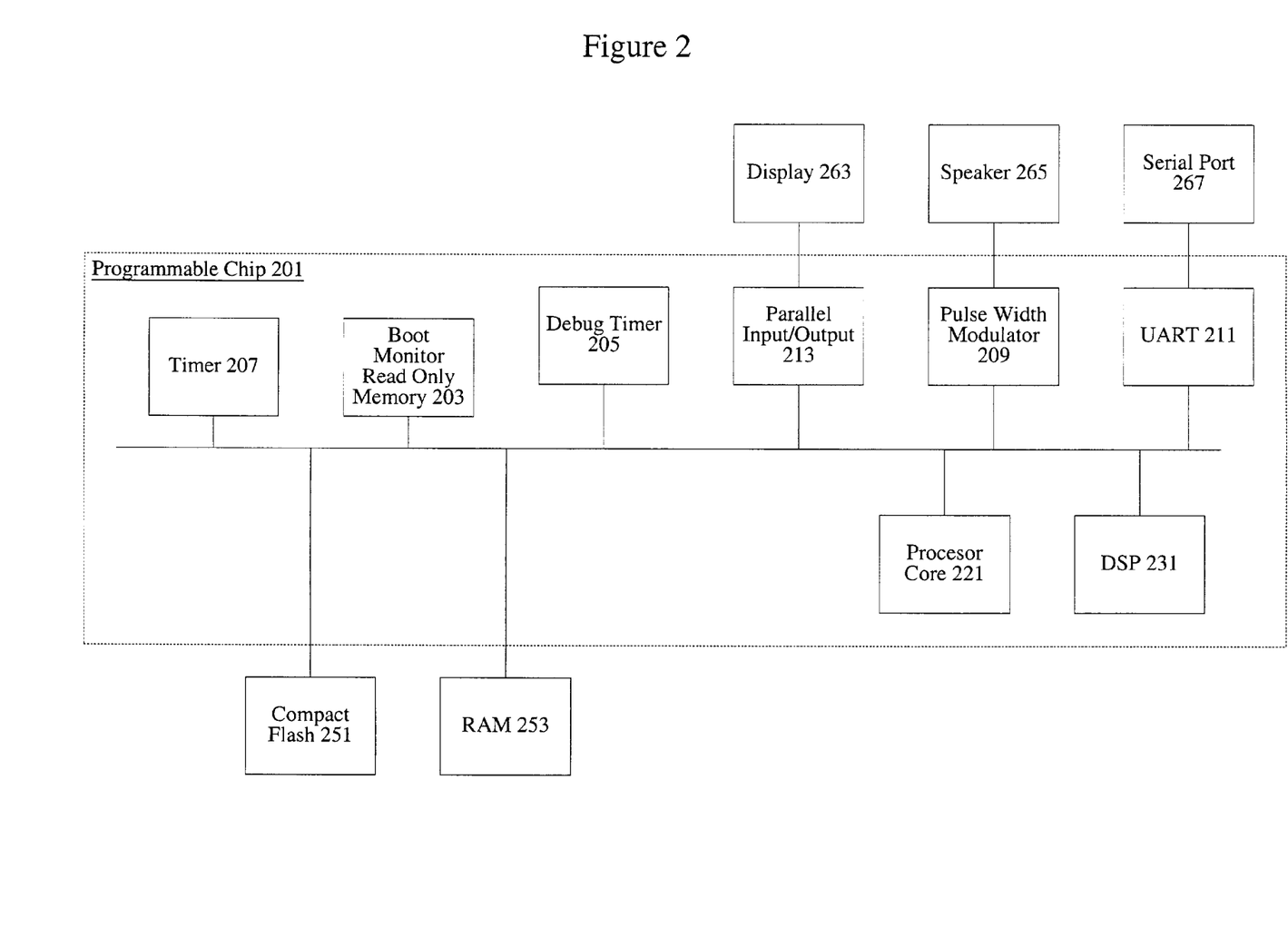
FIG. 2 is diagrammatic representation showing a processor and peripheral components on a programmable chip.

FIG. 2 is a diagrammatic representation showing a programmable chip 201 including a processor core 221 as well as other components. Conventional programmable chips include logic that can be customized for specific applications based on the needs of a particular user. Examples of programmable chips include programmable logic devices (PLDs) and field programmable gate arrays (FPGAs). However, it should be noted that the techniques of the present invention may be applicable for improving both programmable chip and non-programmable chip implementations. The system on programmable chip 201 includes a variety of components such as a timer 207, a boot monitor 203, and a debugging timer 205. The programmable chip 201 also includes a parallel input output (PIO) 213, a pulse width modulator (PWM) 209, and a universal asynchronous receiver transmitter (UART) 211.

The PIO 213, PWM 209, and UART 211 are coupled to off-chip devices including display 263, speaker 265, and serial port 267. The programmable chip 201 also includes interfaces to compact flash memory 251 and random access memory 253. According to various embodiments, the programmable chip 201 also includes a digital signal processor 231. The digital signal processor 231 supports a variety of operations for accelerating the performance of digital signal processing functions such as Discrete Cosine Transforms (DCT), Fast Fourier Transforms (FFT), and Finite Impulse Response Filters (FIR).

In many instances, digital signal processors include support for a variety of parallel multiply operations used frequently by digital signal processing functions. By providing a dedicated component on a programmable chip 201, a processor core 221 has more resources available for performing other operations. Providing a component such as a digital signal processor 231 on a programmable chip 201 usually entails using a large number of programmable chip resources including logic elements (LEs). In one situation, instead of using logic elements to provide a digital signal processor 231, more logic elements could be used to implement a processor core 221 to convert it from an 8-bit processor core to a 16-bit processor core. Nonetheless, trade-offs dictate that components such as digital signal processors be included on a programmable chip 201.

By including the digital signal processor 231 on a programmable chip 201, delays resulting from system bus latency are decreased. Digital signal processor use is also made simpler. Communication between the processor core 221 and the digital signal processor 231 is improved. However, on-chip bus and link latency is still substantial. For example, many clock cycles may elapse before data can be written from a processor core 221 to a digital signal processing component 231. In one example, if an inverse discrete cosine transform (iDCT) needs to be performed, a processor core 221 would have to read data from an external memory source 253, package the data in a particular manner, perform preprocessing of the data, write the data back to a random access memory 253, and pass the digital signal processor 231 instructions to perform the iDCT operations along with a location where the data can be retrieved from random access memory 253. In a specific case, 14 clock cycles elapse simply to perform the read and write. Consequently, substantial inefficiencies still remain from on-chip latencies even though off-chip latencies have been reduced.

Figure 3:
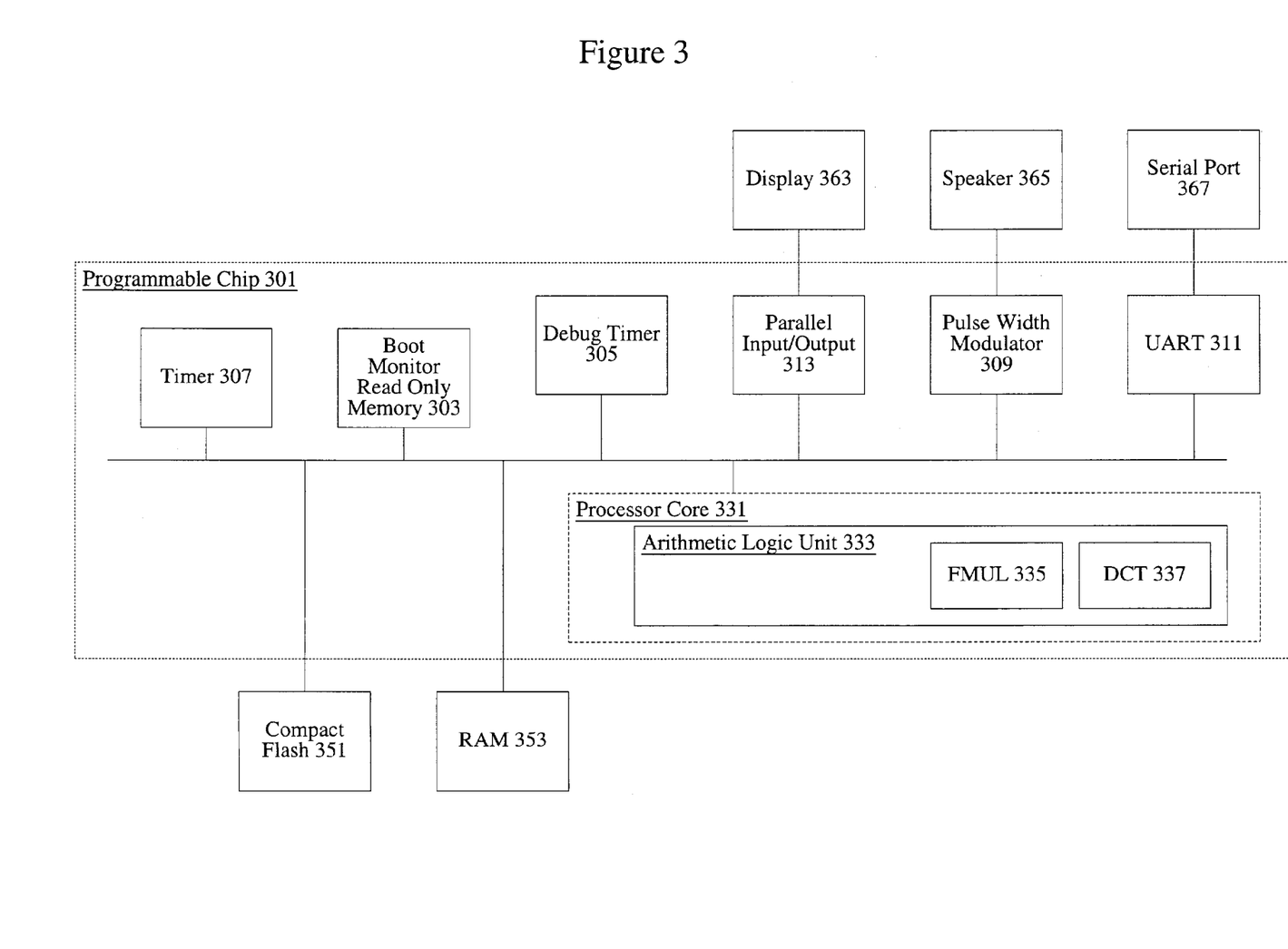
FIG. 3 is a diagrammatic representation showing a processor with an arithmetic logic unit.

FIG. 3 is a diagrammatic representation showing a programmable chip 301 having a processor core 331 supporting complex parallel instructions. It, should be noted that the techniques of the present invention may be applicable for improving both programmable chip and nonprogrammable chip implementations. For example, the components and processor cores shown may be implemented as a system on a chip (SOC) as well as on a system on a programmable chip (SOPC). In this example, the system on the programmable chip 301 includes a variety of components such as a timer 307, a boot monitor 303, and a debugging timer 305.

The programmable chip 301 also includes a parallel input output (PIO) 313, a pulse width modulator (PWM) 309, and a universal asynchronous receiver transmitter (UART) 311. The PIO 313, PWM 309, and UART 311 are coupled to off-chip devices display 363, speaker 365, and serial port 367. The programmable chip 301 also includes interfaces to compact flash memory 351 and random access memory 353. According to various embodiments, the programmable chip 301 does not include a digital signal processor even though a variety of operations such as DCTs and FFTs are performed.

According to various embodiments, various operations such as complex multiplication operations 335 and DCT operations 337 are included as native instructions supported by the processor core 331 in its arithmetic logic unit 333. Any logic or mechanism for performing instructions in a processor core is referred to herein as an arithmetic logic unit. Arithmetic logic units are typically capable of performing instructions such as add, subtract, compare, test, set, etc. In addition to supporting various standard instructions, the processor core 331 includes an optimized or customized instruction set with native instructions for performing operations typically performed using components such as accelerators and digital signal processors. The cost of integrating complex parallel instructions such as DCT functions and complex multiplication operations into an arithmetic logic unit 333 is often substantial. The processor core 331 supporting such complex parallel instructions assumes a large on-chip footprint. Nonetheless, the techniques of the present invention recognize that integrating complex parallel instructions to provide benefits in particular instances despite the trade-offs.

A variety of benefits arise from having a processor core support complex parallel instructions. Interfacing with an arithmetic logic unit is typically much simpler than interfacing with an on-chip or off-chip peripheral. In order to use a peripheral component such as a digital signal processor, the correct bus or link protocol has to be determined. Furthermore, data can be loaded into a digital signal processor on a programmable chip much faster than it is possible to load data onto a peripheral. For example, in a typical 32-bit system, the maximum amount of data that can be loaded into a peripheral is 32-bits. However, many processor cores allow the loading of two 32-bit registers into an instruction in a single clock cycle. The amount of data loaded per clock cycle is hereby doubled.

Typical processors largely fall into the Reduced Instruction Set Computing (RISC) category or the Complex Instruction Set Computing (CISC) category. RISC processors typically execute one simple instruction per clock cycle. Simple instructions include adds, subtracts, compares, etc. Instructions have a uniform length and instruction sets are streamlined to contain only the most frequently used instructions. Complex or interesting instructions are performed by breaking down instructions into simpler instructions. RISC processors typically have at least 16 and as many as 128 registers.

CISC processors typically execute slightly more complex, varying length instructions in multiple clock cycles. For example, instead of performing a simple comparison, a CISC instruction could compare a value against an upper bound as well as a lower bound. Instead of merely testing a condition, a CISC instruction would test, decrement, and branch in a single atomic instruction. In both instances, instructions are performed as atomic units in each processor. Any indivisible unit is referred to herein as an atomic unit.

For example, if a processor is executing an atomic add or add with extend instruction, no other intervening instruction can take place within the processor. That is, no other instruction can be performed until the atomic add or add extend instruction is complete. According to various embodiments of the present invention, particular instructions are no longer atomic. Using control circuitry, an instruction can be polled to determined if the instruction is complete. For example, other instructions can be performed by the processor in parallel while the output of a DCT instruction is being computed. The custom instruction can be polled to determine if it has completed the calculation. If complete, the output data can be unloaded while loading the next group of inputs.

Typical complex instructions can effectively prevent a processor from performing any other operations for substantial number of clock cycles. Furthermore, complex instructions may take a large amount of processor resources to implement. Consequently, current instruction sets including RISC and CISC instruction sets include only relatively simple instructions. However, according to various embodiments of the present invention, mechanisms are provided to allow complex parallel instructions. The complex parallel instructions include mechanisms for allowing other instructions to run while the complex parallel instructions running. In other words, running a complex parallel instruction will not prevent another instruction from running until the complex parallel instruction is complete. Any multiple cycle instruction that allows intervening instructions to run on a processor core while the multiple cycle instruction is running is referred to herein as a complex parallel instruction.

In some examples, a complex parallel instruction is a customized multiply instruction or a DCT instruction included in the instruction set or customized instruction set of a processor. The complex parallel instructions allow intervening instructions to run after the complex parallel instructions started and before the complex parallel instruction is complete. Instead of having to pass information between a processor core and a digital signal processor, instructions can be called directly to perform a particular operation in a processor core 331, even if the particular operation takes many clock cycles. On-chip and off-chip latency is minimized.

DCT operations can be performed as native instructions. Performance can be substantially enhanced when selected operations are incorporated as native instructions in an instruction set of a processor core. A tool available for creating custom instructions for a processor on a programmable chip is the SOPC Builder with the Nios processor core available from Altera Corporation of San Jose, Calif. Mechanisms for implementing an optimized instruction set are described in U.S. patent application Ser. No. 10/357,749 titled Methods And Apparatus For Optimizing A Processor Core On A Programmable Chip by Martin Langhammer and filed on Feb. 3, 2003, the entirety of which is incorporated by reference for all purposes.

Figure 4:
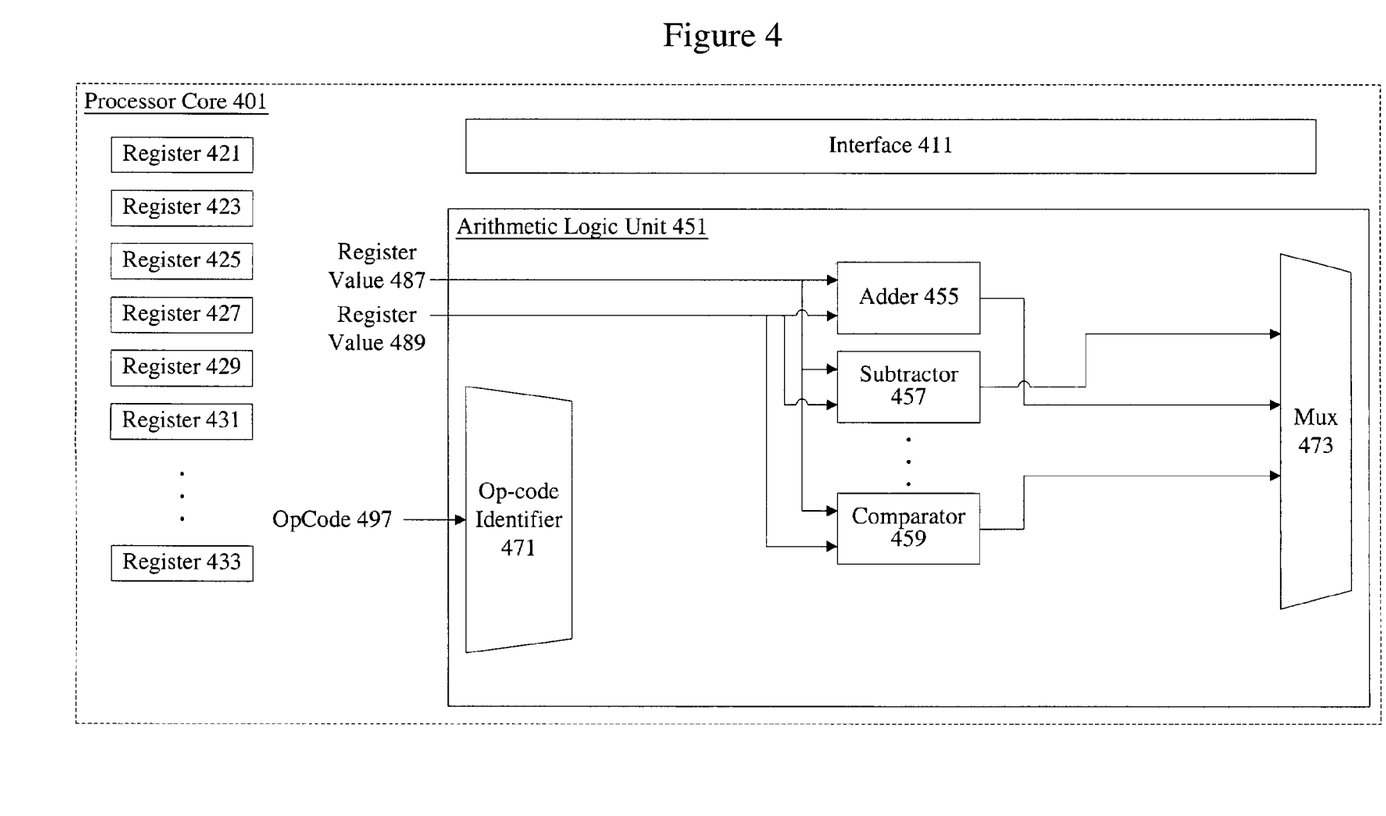
FIG. 4 is a diagrammatic representation showing a typical arithmetic logic unit and various components for executing instructions.

FIG. 4 is a diagrammatic or presentation showing a processor core including an arithmetic logic unit that does not support complex parallel instructions. According to various embodiments, the processor core 401 includes an interface 411 coupling the processor core 401 to off-chip devices such as random access memory. The processor core 401 also includes registers 421-433 for holding data for processing. Typical RISC processors can include between 16 and 256 registers. The processor core 401 also includes an arithmetic logic unit 451 that provides mechanisms for implementing large number of instructions. The processor core 401 itself without the arithmetic logic unit 451 can support instructions such as returning register values or writing registers. In some instances, instructions are simply implemented by the processor core 401. An arithmetic logic unit 451 includes an operation code identifier or an opcode identifier 471 the takes an instruction message (e.g. ADD R1 R2) and identifies the instruction supported for performing the operation.

Any message identifying an operation code and one or more data values is referred to herein as an instruction message. Any identifier used to determine what operation should be performed on one or more data values is referred to herein as an operation code or an opcode. The operation itself to be performed on the one or more data values is referred to herein as an instruction. For example, the instruction message ADD R1 R2 has an opcode of ADD and is performed by the instruction including adder 455 in the arithmetic logic unit 451. Other instructions supported include subtractor 457, comparator 459, test condition, rotate, test operand, etc.

When an instruction message is received, the operation code identifier 471 determines the opcode 497 and selects one of the instructions in the arithmetic logic unit 451 for performing the operation. In one example, the opcode identifier 471 selects the adder 455 for adding register values 487 and 489. The output is provided to a multiplexer 473 and is eventually routed through interface 411 to an external entity such as random access memory coupled to the processor core 401. While the adder 455 is performing its operation, no other instructions can be performed. A set number of input register values can be provided during any particular clock cycle and a set number of outputs can be provided by the multiplexer 473. No mechanisms are provided to allow simultaneous processing of instructions.

CISC processor cores similarly provide an arithmetic logic unit. However, some instruction supported by the arithmetic logic unit may take more than one clock cycle and may in fact combine various tests instructions with decrement or set instructions. Even though the instructions may take multiple clock cycles, while a particular CISC instruction is being performed, no other intervening instructions can take place. That is, the test and set instruction must begin and complete before a test and decrement instruction can even begin. Similarly, a set number of inputs can be provided during any given clock cycle and a set number of outputs can be provided by the multiplexer during any particular clock cycle.

Figure 5:
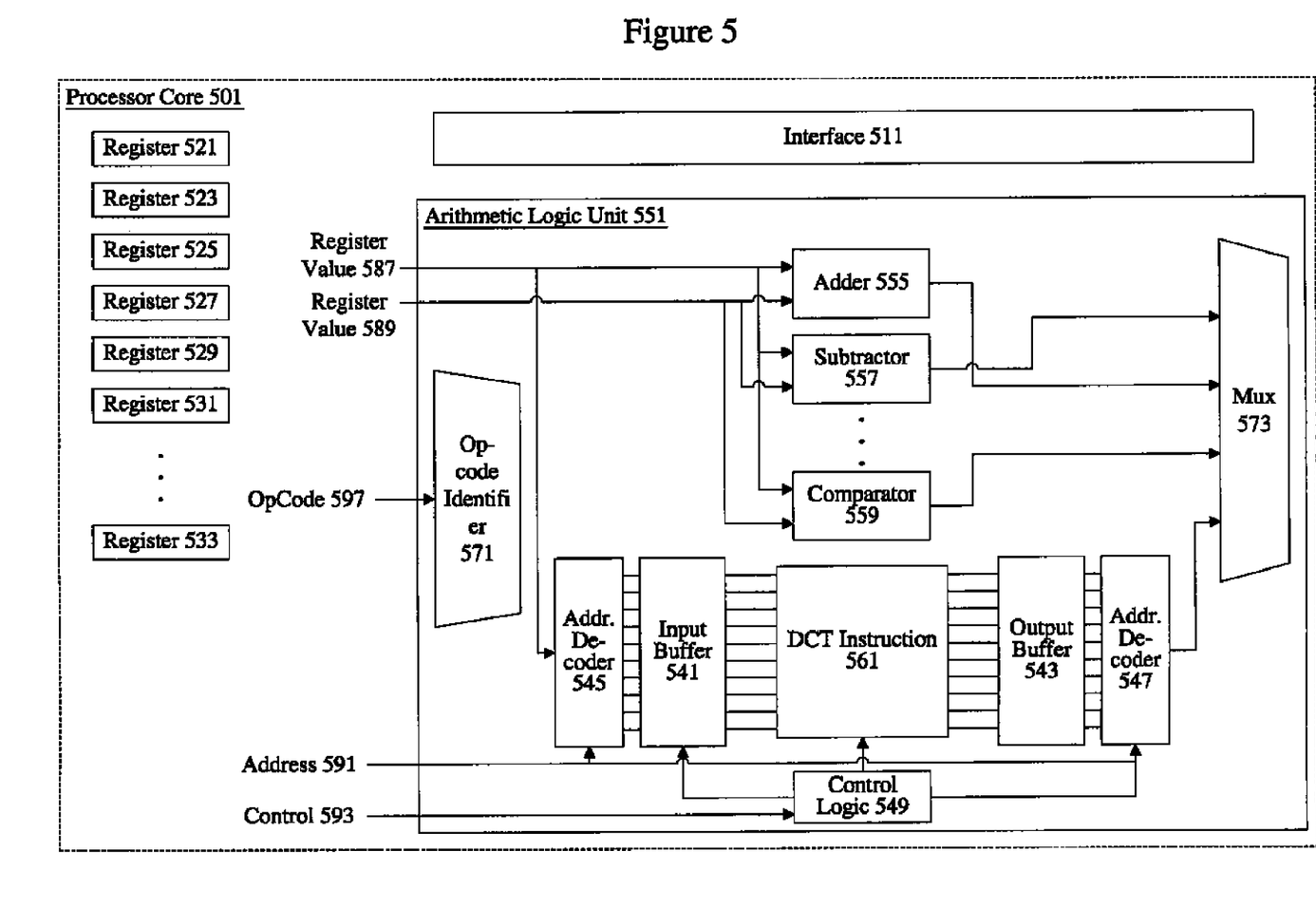
FIG. 5 is a diagrammatic representation showing an arithmetic logic unit having control logic for executing complex instructions

FIG. 5 is a diagrammatic representation showing a processor core 501 that supports complex parallel instructions. According to various embodiments the processor core 501 includes an interface 511 coupling the processor core 501 to other components such as random access memory. The processor core 501 also includes registers 521-533 for holding data for processing. The arithmetic logic unit 551 includes adder 555, subtractor 557, and comparator 559 for performing operations such as add, subtract, and compare. However, the arithmetic logic unit 551 also includes DCT instruction 561 for performing a DCT operation. In one embodiment, the DCT instruction 561 takes 32 inputs and provides 32 outputs after processing. Conventional instructions typically take two or three inputs and provide a single output. The DCT instruction 561 may also take a substantial or even unknown number of clock cycles to perform.

Consequently, the processor core 501 can not afford to wait for the DCT operation to complete. The techniques of the present invention provide mechanisms for allowing a DCT instruction or other complex parallel instructions to run while intervening instructions occur. The techniques of the present invention provide instructions for filling a DCT instruction 561 input buffer 541 with data values. Particular addresses for the data values are provided to address decoder 545. According to various embodiments, the entries in the input buffer 541 and output buffer 543 correspond to the same address provided by the address decoder 545. In one example, instructions are provided to load the input buffer 541 with 32 different data values.

A start instruction is then transmitted via control logic 549 to begin DCT processing. Since the number of clock cycles taken to complete the DCT operation is often substantial or even unknown, the techniques of the present invention allow other instructions such as subtracts or even other complex parallel instructions to run while the DCT instruction 561 is running. The control logic 549 periodically polls the DCT instruction 561 to determine when the operation is complete. The 32 output data values are written into output buffer 543. The output data values can then be unloaded. The DCT instruction 561 along with the input buffer 541, the output buffer 543, and the control logic 549 allow the DCT instruction 561 to operate somewhat independently from the rest of the arithmetic logic unit 551.

According to various embodiments, the techniques of the present invention provide that a variety of fields are passed to an arithmetic logic unit 551 to allow performance of a DCT instruction 561. In one example, the instruction message for performing the DCT instruction 561 includes an opcode value 597 that allows an opcode identifier 571 to select the DCT instruction 561 from the available instruction set. The instruction message also includes data in register value 587. In many instances, the register value 587 is loaded into the input buffer 541. The location where the register value is loaded into the input buffer 541 is provided by the address field in the instruction message. The address 591 indicates where the register value 587 should be loaded into both the input and output buffers. In one example, the DCT instruction 561 takes 32 inputs and provides 32 outputs. The address 591 indicates which one of the 32 entries of the input buffer should be loaded. The instruction message also includes a control field 593 that indicates to control logic 549 the state of the operation that should be performed by the DCT instruction 561.

Any logic or mechanism indicating the state of an operation to instruction circuitry in a processor core is referred to herein as complex parallel instruction control information. According to various embodiments, the control information indicates if the data value should be loaded into input buffer 541 and/or read from output buffer 543. In another example, the control information indicates whether the DCT instruction should begin performing operations on the values in input buffer 541 or whether the DCT instruction 561 should be polled to determine if processing is complete. According to various embodiments, control logic 549 can also be used to perform other functions and make minor variations to the DCT instruction 561 to perform the inverse DCT operation. It should be noted that a processor core supporting complex parallel instructions according to the techniques of the present invention can also support conventional instructions such as RISC or CISC instructions. In one example, RISC and CISC instructions are reformatted as complex parallel instruction messages. In another example, RISC and CISC instructions are merely passed using conventional fields.

Figure 6:
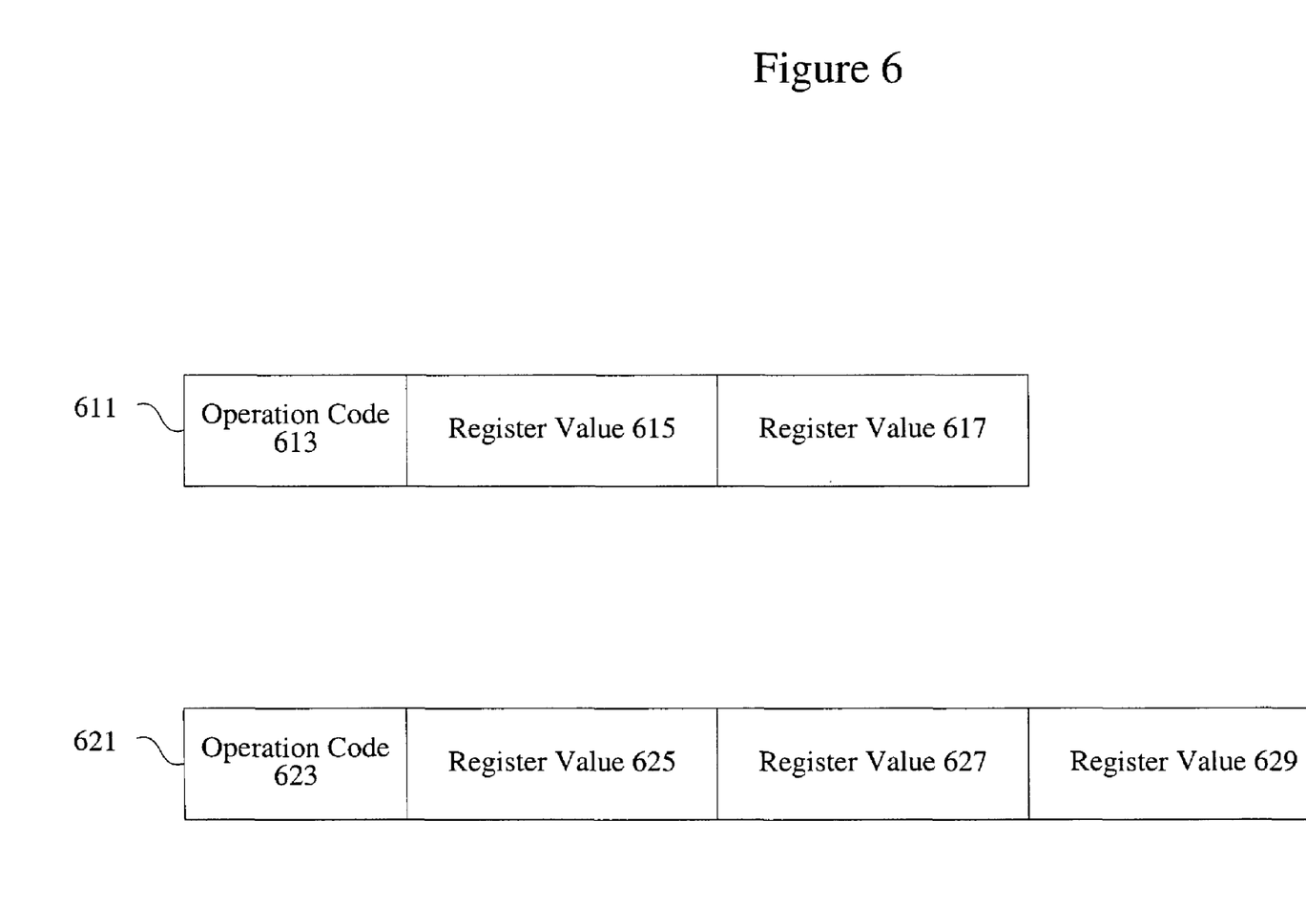
FIG. 6 is a diagrammatic representation showing a typical operation code and input data.

FIG. 6 is a diagrammatic representation showing an instruction message used by conventional instructions in an arithmetic logic unit. These instructions differ somewhat than those used in a processor core supporting complex parallel instructions. Conventional instruction messages 611 and 621 include operation codes 613 and 623. The instruction messages also include a set number of register values such as register values 615, 617, 625, 627, and 629. Instruction message 611 with two register values 615 and 617 can be used for an add instruction taking two inputs. An instruction message 621 with three register values 625, 627, and 629 can be used for an add instruction taking three inputs. Conventional instruction messages are adequate for relatively simple instructions. However, the techniques of the present invention provide improved instruction messages for allowing complex parallel instructions.

Figure 7:
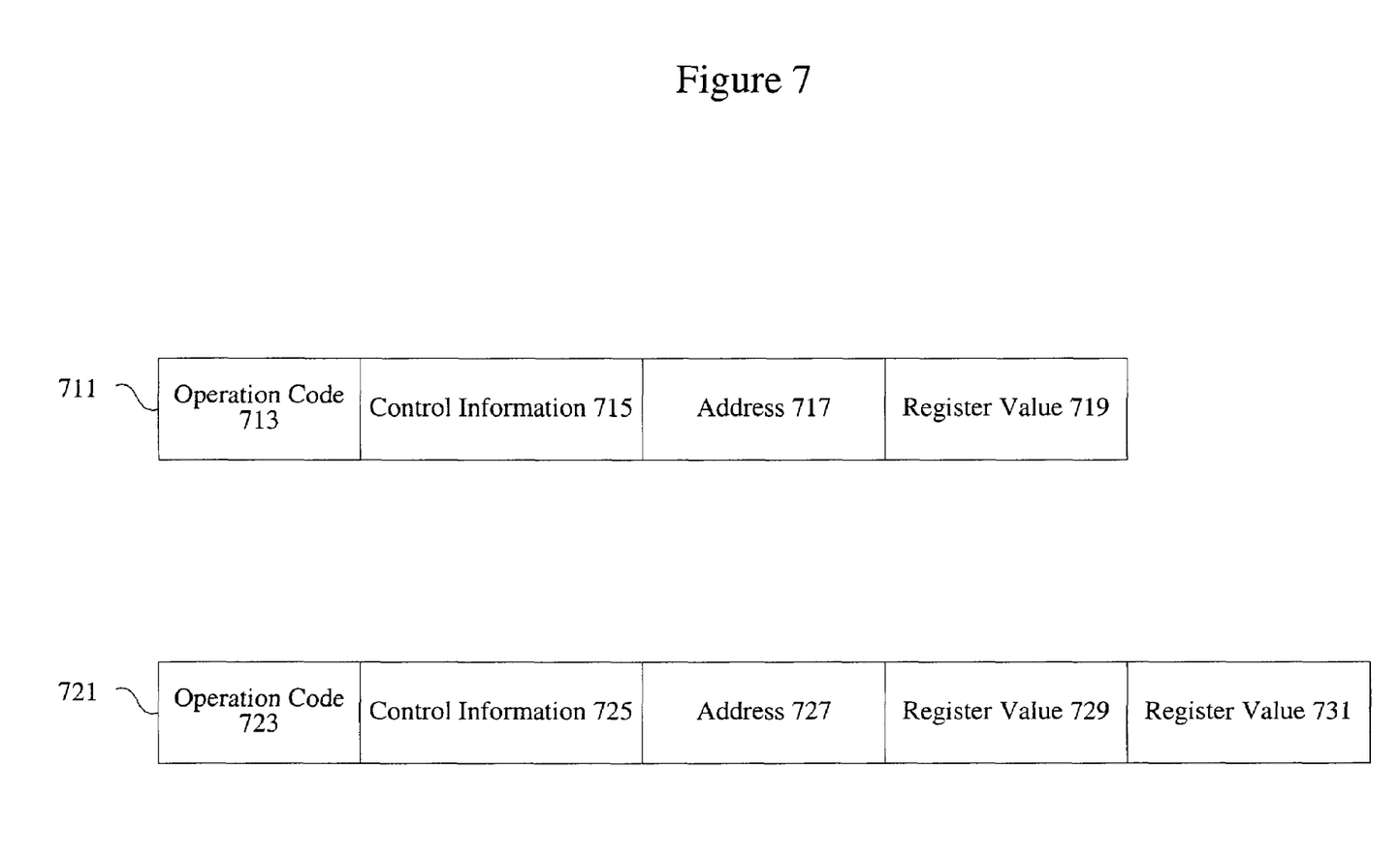
FIG. 7 is a diagrammatic representation showing a complex instruction format.

FIG. 7 is a diagrammatic representation showing instruction messages for complex parallel instructions. Instruction message 711 includes an operation code 713 for identifying a particular instruction supported in the processor core instruction set. In some examples, the instruction may be a custom instruction. Control information 715 directs control circuitry to determine whether data should be loaded, unloaded, etc. Control information 715 also directs the instruction circuitry to begin processing and can indicate that instruction circuitry should be polled to determine if processing is complete. Address 717 provides information on where register value 719 should be stored. Instruction message 721 also includes an operation code 723, control information 725, an address 727, and register values 729 and 731. It should be noted that the instruction messages for complex parallel instructions can be provided in a variety of formats. For example, multiple address fields can be provided with multiple register values. In some instances, addresses for input buffers and output buffers are different, and multiple address fields are included in the instruction message. In still other examples, a single buffer may be used for both input and output, and a flag along with an address may be provided. According to various embodiments, processor cores can be configured to support both the instruction message format with control logic information and the instruction message format without control logic information.

Figure 8:
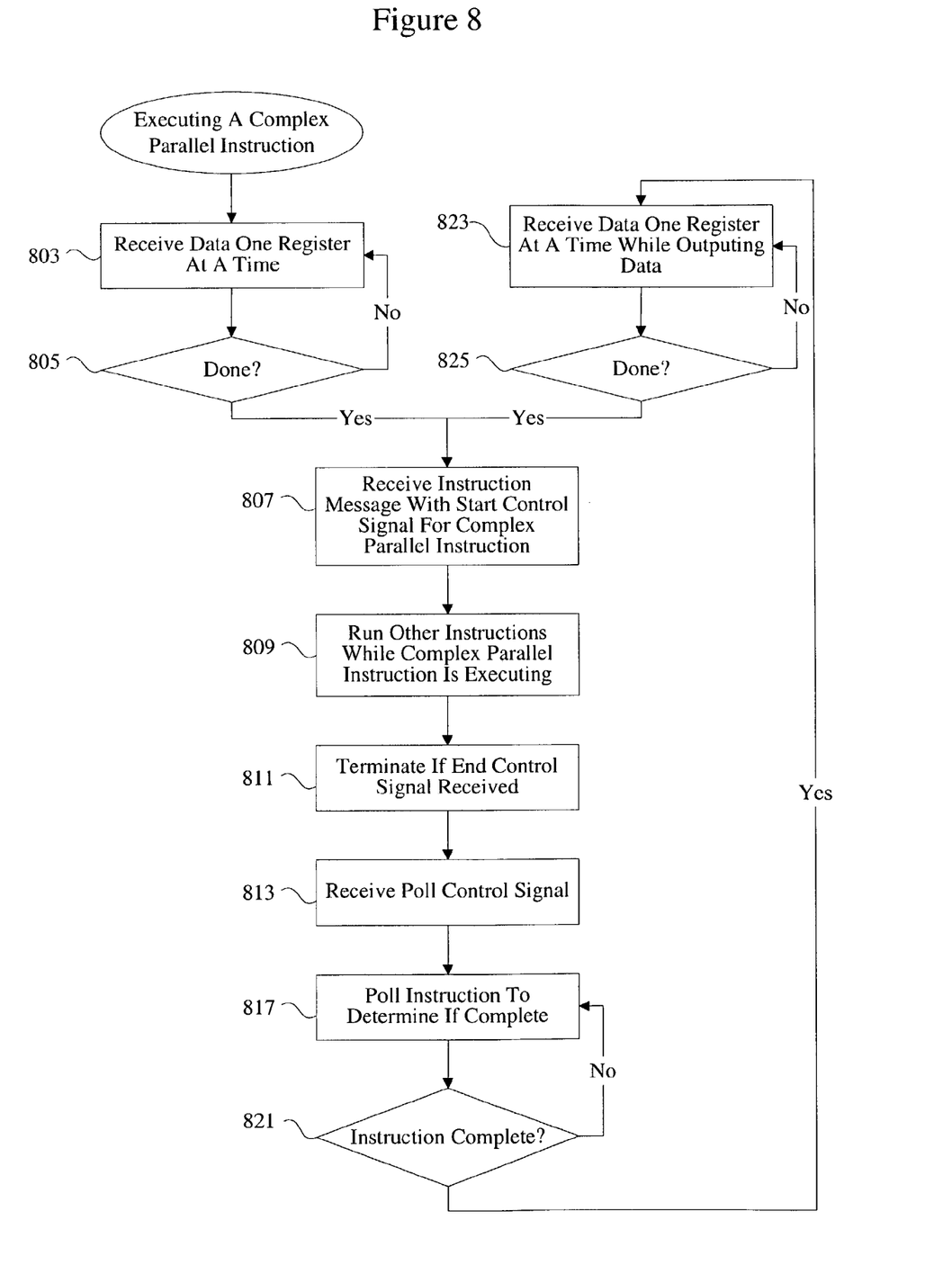
FIG. 8 is a flow process diagram showing use of a complex instruction.

FIG. 8 is a flow process diagram showing a technique for executing a complex parallel instruction. According to various embodiments, data is received one register at a time at 803. In many examples, the control fields for receiving data one register at a time is a load control signal or a default control signal. At 805, it is determined if receipt of data is complete. If receipt of data is complete, an instruction message with a start control signal for a complex parallel instruction is received at 807. After the complex parallel instruction is started and while the complex parallel instruction is running, other instructions can be performed by the same processor core at 809. In some examples, other instructions such as tests and sets can be performed. In other examples, other complex parallel instructions such as a custom multiply or an FFT can be performed.

If an end control signal is received, processing is terminated at 811. At 113, the arithmetic logic unit receives a poll control signal. Based on the poll control signal, the instruction is polled to determine if processing is complete at 117. If processing is complete at 821, data is again received one register at a time at 823 while data is output. A determination of when data is done being received one register at a time while data is output is made at 825. In some instances, data is written to external memory. In other examples, data is written to registers. The process flow can then continue performance of the complex parallel instruction.

Figure 9:
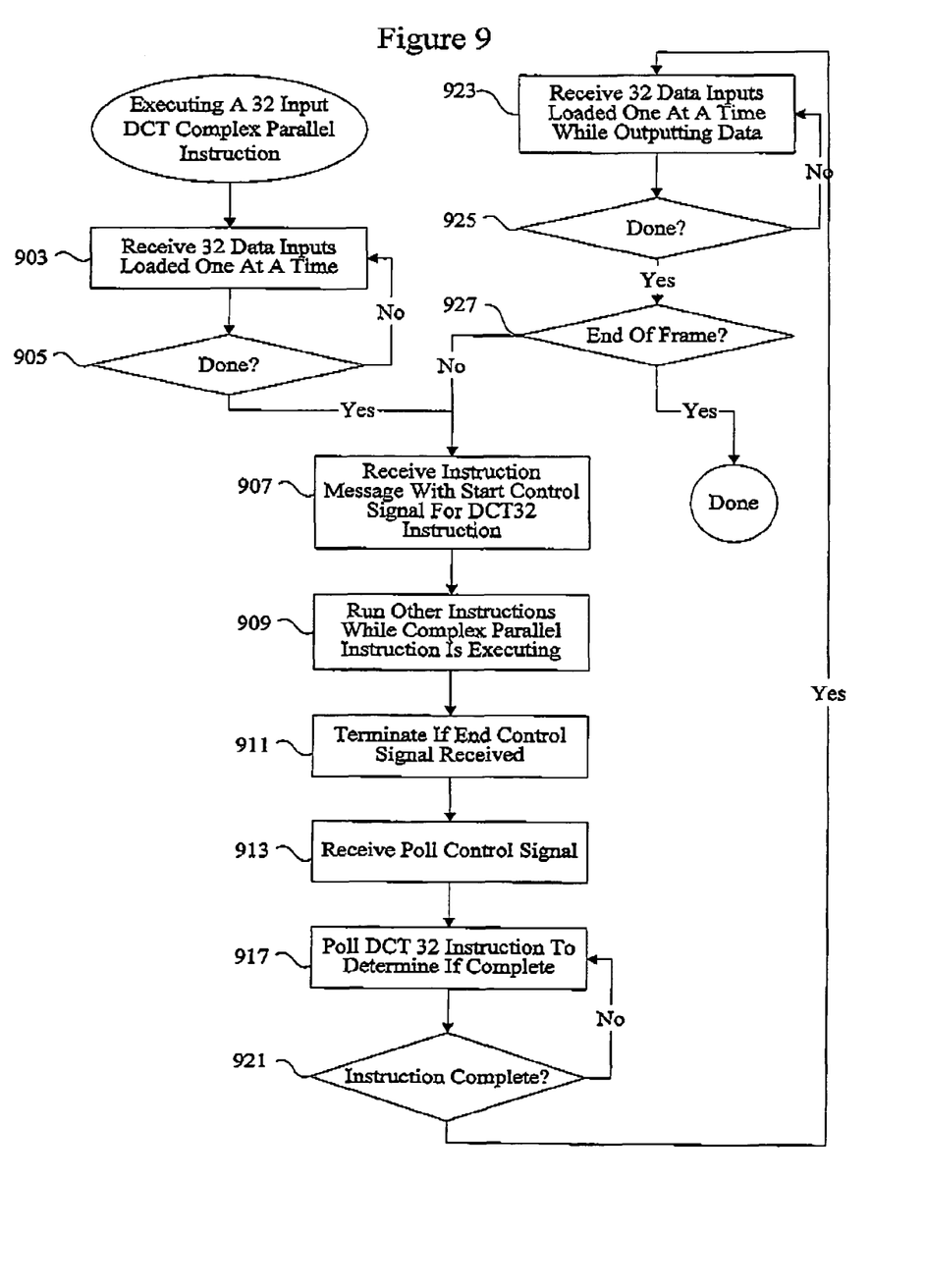
FIG. 9 is a flow process diagram showing use of a DCT complex instruction.

FIG. 9 is a flow process diagram showing execution of a 32 input DCT complex parallel instruction. At 903, 32 data inputs are loaded one at a time. According to various embodiments, more than one data input can be loaded by any particular instruction. For example, multiple data inputs could be loaded in a cycle clock cycle into multiple addressed entries in an input buffer. When it is determined that loading is done at 905, an instruction message with a start control signal for the DCT 32 instruction is received at 907. At 909, other instructions can be run by the same processor core while the complex parallel instruction is executing. At 911, the instruction is terminated if an end control signal is received. At 913, a poll control signal is received. At 917, the DCT 32 instruction is polled to determine if processing is complete. If it is determined that the instruction is complete at 921, the 32 data inputs are again loaded one at a time while data is output at 923 until done at 925. According to various embodiments, large number of data inputs and data outputs can be loaded and unloaded simultaneously. When the loading and loading is performed, it is determined at 927 if the end of the frame such as the end of an MPEG frame is reached. If the end of the frame is reached, execution of the DCT complex parallel instruction is complete. Otherwise a start control signal is again awaited to allow processing of the data in the input buffer to continue.

Figure 10:
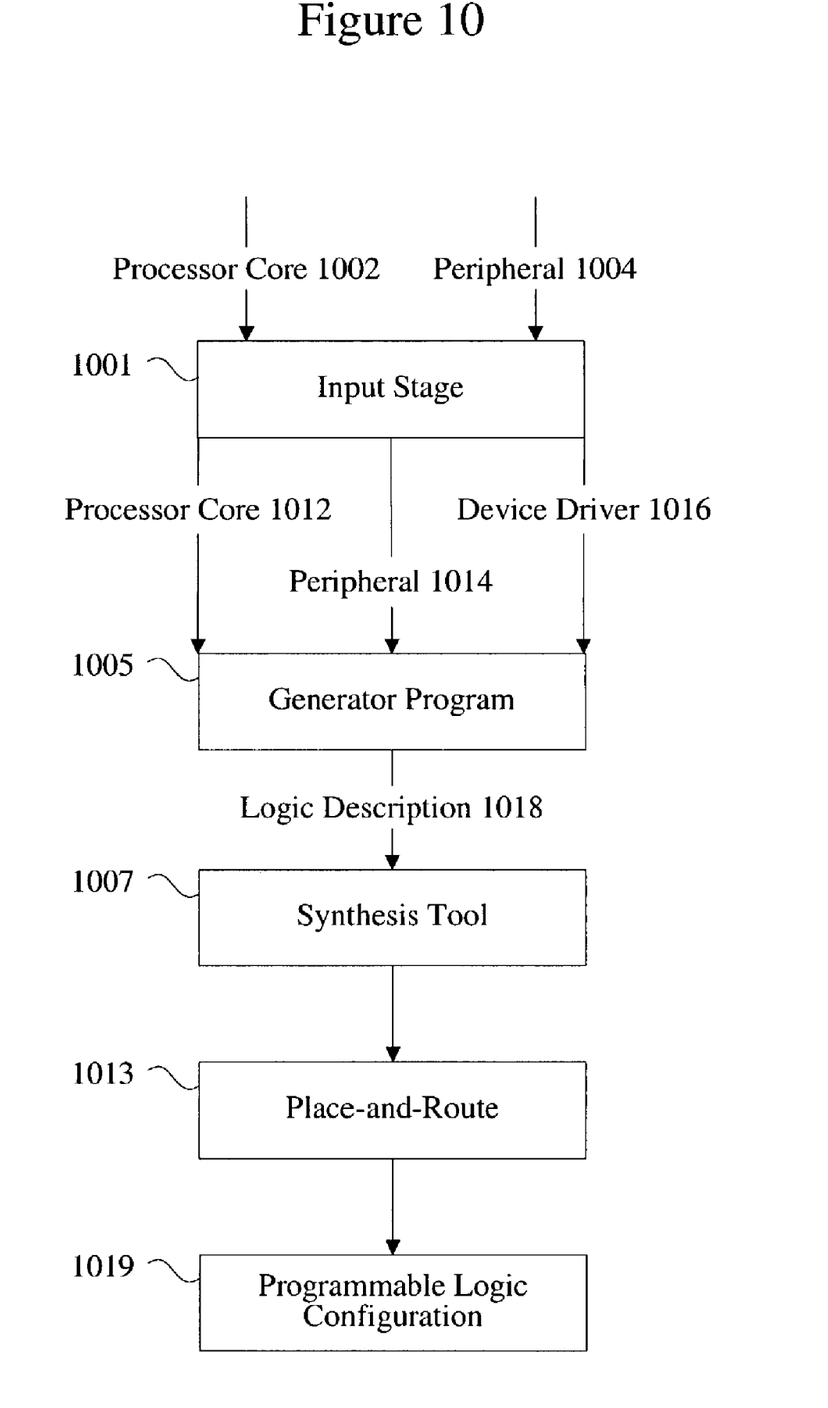
FIG. 10 is a diagrammatic representation showing techniques for implementing a processor core supporting complex instructions on a programmable chip.

FIG. 10 is a diagrammatic representation showing one context that can use the techniques of the present invention. Although the techniques of the present invention will be described in the context of tools for including complex parallel instructions in a processor core, it should be noted that the techniques of the present invention can be applied to a variety of contexts. For example, instead of providing complex parallel instructions in a processor core, complex parallel instructions can be included in an ASIC.

An application environment such as an input stage 1001 is provided to allow a user to select and customize components on a programmable chip. Some examples of components are processor cores such as a RISC processor core, peripheral interfaces such as an interface to external memory, and peripheral components such as a timer or universal asynchronous receiver transmitter (UART). Processor core, peripherals, and other components can all be interconnected on the programmable chip. The components can also be connected with on-chip or off-chip components.

An application environment provides a platform to run tools to allow selection and parameterization of components. In one example, the application environment is IP Toolbench (an IP Software development platform) available from Altera Corporation of San Jose, Calif. and the various tools are component and the associated component wizards. Any tool used to customize a component for implementation on a programmable chip is referred to herein as a wizard. According to various embodiments, each component has an associated wizard. A processor core component 1002 includes a wizard for displaying windows for parameterizing the processor core for implementation on the programmable chip. A peripheral component 1004 includes a wizard for receiving parameter information on a peripheral. Each component may use component specific modules and shared modules for receiving and storing data. Configuring a programmable chip with a particular logic description or downloading a logic description onto a programmable chip is referred to herein as implementing a programmable chip. Some examples of programmable chips that can be implemented using the techniques of the present invention are programmable logic devices, complex programmable logic devices, programmable logic arrays, programmable array logic devices, and field-programmable gate arrays.

A generator program creates a logic description of the various modules using processor core information 1012, peripheral information 1014, and device driver information 1016 also associated with various components. The processor core information 1012, peripheral information 1014, and device driver information 1016 may all be provided to the generator program using the same module shared by various components.

With the processor core information 1012 and the peripheral information 1014 provided accurately, the generator program 1005 can then output a logic description 1018. The logic description 1018 is then passed to a variety of synthesis tools, place and route programs 1013, and programmable logic configuration tools 1019 to allow a logic description to be downloaded onto the programmable chip.

According to various embodiments, the generator program 1003 is a Perl script creating HDL files such as Verilog, Abel, VHDL, and AHDL files from the parameter information entered by a user. In some embodiments, the generator program 1003 also provides information to a synthesis tool 1007 to allow HDL files to be automatically synthesized. Some of the available synthesis tools are Leonardo Spectrum, available from Mentor Graphics Corporation of Wilsonville, Oreg. and Synplify available from Synplicity Corporation of Sunnyvale, Calif.

According to various embodiments, the place and route tool 1013 and the programmable logic configuration stage 1019 are provided in the Quartus Development Tool, available from Altera Corporation of San Jose, Calif. As will be appreciated by one of skill in the art, a variety of synthesis, place and route, and programmable logic configuration tools can be used to implement various techniques of the present invention. A tool available for creating custom instructions for a processor on a programmable chip is the SOPC Builder with the Nios processor core available from Altera Corporation of San Jose, Calif.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of different file formats, languages, and communication protocols and should not be restricted to the ones mentioned above. Therefore, the scope of the invention should be determined with reference to the appended claims.

What is claimed is:

1. A method for executing processor instructions, the method comprising:

receiving a complex parallel instruction including an operation code in a first field, control information in a second field distinct from the first field, and input data, the complex parallel instruction received at an arithmetic logic unit in a processor, the processor and the arithmetic logic unit supporting a conventional instruction set and a complex parallel instruction set, wherein control information directs control circuitry to determine whether a data value should be loaded into an input buffer or unloaded from an output buffer;

executing the complex parallel instruction in the arithmetic logic unit using the input data, the execution state of the complex parallel instruction determined by the control information included in the complex parallel instruction, wherein the arithmetic logic unit is operable to run a conventional instruction set instruction simultaneously in the arithmetic logic unit while the complex parallel instruction is being run in the arithmetic logic unit.

2. The method of claim 1, wherein possible execution states include starting the execution of the instruction, polling to determine if the instruction is complete, and loading or unloading the instruction.

3. The method of claim 2, wherein polling to determine if the instruction is complete allows execution of instructions taking an indeterminate number of clock cycles.

4. The method of claim 2, wherein polling to determine if the instruction is complete allows execution of intervening instructions on the arithmetic logic unit while the instruction is executing on the arithmetic logic unit.

5. The method of claim 4, wherein polling to determine if the instruction is complete allows execution of a Fast Fourier Transform function as a single instruction.

6. The method of claim 4, wherein polling to determine if the instruction is complete allows execution of a Discrete Cosine Transform function as a single instruction.

7. The method of claim 1, wherein the processor is a processor core on a programmable chip.

8. The method of claim 1, wherein the instruction is a customized instruction.

9. The method of claim 1, further comprising receiving address information identifying a location in an input buffer associated with the arithmetic logic unit.

10. The method of claim 9, wherein address information identifies a location in an output buffer associated with the arithmetic logic unit.

11. The method of claim 1, wherein the arithmetic logic unit allows an ADD instruction to run at the same time as a Discrete Cosine Transform (DCT) instruction in the arithmetic logic unit.

12. The method of claim 11, wherein the plurality of input buffers allow loading of data from a plurality of processor registers into the arithmetic logic unit in a single clock cycle.

13. The method of claim 11, wherein the plurality of output buffers allow writing of a plurality of output values in a single clock cycle.

14. A processor, comprising:

a plurality of registers;

an interface coupling the processor to off-chip memory;

an arithmetic logic unit coupled to the plurality of registers and the interface, the arithmetic logic unit supporting a conventional instruction set and a complex parallel instruction set, the arithmetic logic unit including a plurality of input buffers and a plurality of output buffers, wherein the arithmetic logic unit is operable to load data from registers into the input buffers when a complex parallel instruction including an operation code in a first field, control information in a second field distinct from the first field, and input data in a third field is received with a load execution state and start execution of the instruction when the instruction is received with a start execution state, wherein control information directs control circuitry to determine whether a data value should be loaded into an input buffer or unloaded from an output buffer and wherein the arithmetic logic unit is operable to execute a conventional instruction set instruction while the complex parallel instruction is executing.

15. The processor of claim 14, wherein the arithmetic logic unit is further operable to poll to determine if the instruction is complete when the instruction is received with a polling execution state.

16. The processor of claim 14, wherein the arithmetic logic unit is operable to execute an intervening instruction after the instruction with the start execution state is received.

17. The processor of claim 14, wherein the arithmetic logic unit is operable to execute an intervening instruction while polling for completion of the instruction.

18. The processor of claim 14, wherein the arithmetic logic unit is further operable to receive address information identifying a location in an input buffer associated with the arithmetic logic unit.

19. The processor of claim 18, wherein address information identifies a location in an output buffer associated with the arithmetic logic unit.

20. The processor of claim 19, wherein the plurality of input buffers allow loading of data from a plurality of processor registers into the arithmetic logic unit in a single clock cycle.

21. The processor of claim 19, wherein the plurality of output buffers allow writing of a plurality of output values in a single clock cycle.

22. The processor of claim 19, wherein polling to determine if the instruction is complete allows execution of a Fast Fourier Transform function as a single instruction.

23. The processor of claim 19, wherein polling to determine if the instruction is complete allows execution of a Discrete Cosine Transform function as a single instruction.

24. The processor of claim 23, wherein the processor is a processor core on a programmable chip.

25. The processor of claim 23, wherein the instruction is a customized instruction.

26. A processor having a supported instruction set, the processor comprising:

means for receiving a complex parallel instruction including an operation code in a first field, control information in a second field distinct from the first field, and input data, the complex parallel instruction received at an arithmetic logic unit in a processor, the processor and the arithmetic logic unit supporting a conventional instruction set and a complex parallel instruction set, wherein control information directs control circuitry to determine whether a data value should be loaded into an input buffer or unloaded from an output buffer;

means for executing the complex parallel instruction in the arithmetic logic unit using the input data, the execution state of the complex parallel instruction determined by the control information included in the complex parallel instruction, wherein the arithmetic logic unit is operable to run a conventional instruction set instruction in the arithmetic logic unit while the complex parallel instruction is being run in the arithmetic logic unit.

27. The processor of claim 26, wherein possible execution states include starting the execution of the instruction, polling to determine if the instruction is complete, and loading or unloading the instruction.

28. The processor of claim 27, wherein polling to determine if the instruction is complete allows execution of instructions taking an indeterminate number of clock cycles.

29. The processor of claim 27, wherein polling to determine if the instruction is complete allows execution of intervening instructions on the arithmetic logic unit while the instruction is executing on the arithmetic logic unit.

30. The processor of claim 29, wherein polling to determine if the instruction is complete allows execution of a Fast Fourier Transform function as a single instruction.

* * * * *